US010282733B2

United States Patent
Arslan

(10) Patent No.: US 10,282,733 B2
(45) Date of Patent: May 7, 2019

(54) SPEECH RECOGNITION ANALYSIS AND EVALUATION SYSTEM AND METHOD USING MONOTONY AND HESITATION OF SUCCESSFUL CONVERSATIONS ACCORDING TO CUSTOMER SATISFACTION

(71) Applicant: SESTEK SES VE ILETISIM BILGISAYAR TEKNOLOJILERI SANAYII VE TICARET ANONIM SIRKETI, Istanbul (TR)

(72) Inventor: Mustafa Levent Arslan, Istanbul (TR)

(73) Assignee: SESTEK SES VE ILETISIM BILGISAYAR TEKNOLOJILERI SANAYII VE TICARET ANONIM SIRKETI, Istanbul (TR)

( * ) Notice: Subject to any disclaimer, the term of this patent is extended or adjusted under 35 U.S.C. 154(b) by 584 days.

(21) Appl. No.: 14/924,733

(22) Filed: Oct. 28, 2015

(65) Prior Publication Data

US 2016/0125419 A1  May 5, 2016

(30) Foreign Application Priority Data

Oct. 30, 2014 (TR) .............................. a 2014/12693

(51) Int. Cl.
| | |
|---|---|
| G10L 17/26 | (2013.01) |
| G06Q 30/02 | (2012.01) |
| G06Q 30/00 | (2012.01) |
| G10L 25/51 | (2013.01) |

(52) U.S. Cl.
CPC ............ *G06Q 30/016* (2013.01); *G10L 25/51* (2013.01); *G06Q 30/0282* (2013.01); *G10L 17/26* (2013.01)

(58) Field of Classification Search
CPC ............................ G10L 17/26; G06Q 30/0282
USPC .......................................... 704/231; 705/347
See application file for complete search history.

(56) References Cited

U.S. PATENT DOCUMENTS

| | | | | |
|---|---|---|---|---|
| 2011/0282662 | A1* | 11/2011 | Aonuma | G10L 17/26 704/231 |
| 2013/0046706 | A1* | 2/2013 | Keerthi | G06Q 30/0282 705/347 |

* cited by examiner

*Primary Examiner* — Farzad Kazeminezhad
(74) *Attorney, Agent, or Firm* — Gokalp Bayramoglu

(57) ABSTRACT

A speech analysis and evaluation system and method where behavioral and conversational features of successful customer representatives are determined. Reference models are obtained by analyzing the voices of the successful customer representatives using the voices' monotony and hesitation acoustic parameters and their respective speech recognition reliability score. A successful customer representative is the one that increases customer's satisfaction as a result of a conversation with a customer. Reference models that are generated by analyzing the voices of successful customer representatives are used for recruitment and training purposes.

8 Claims, 2 Drawing Sheets

SPEECH RECOGNITION ANALYSIS AND EVALUATION SYSTEM AND METHOD USING MONOTONY AND HESITATION OF SUCCESSFUL CONVERSATIONS ACCORDING TO CUSTOMER SATISFACTION

TECHNICAL FIELD

This invention relates to a speech analysis and evaluation system and method where behavioral and conversational features of successful customer representatives are determined.

BACKGROUND

Customer satisfaction plays a critical role in corporate success. There are many factors that affect customer satisfaction. These factors include: (1) the dialogues of the customer representatives communicating with customers in an electronic or physical media such as call centers and banks, and (2) the efficiency of the communication and its correlation to the customer satisfaction. Call center analysis show that certain dialogues of the customer representatives increase customer satisfaction. When a customer is not satisfied as a result of a conversation with a customer representative, the customer may complain about his/her dissatisfaction. Customers' complaints about his/her unpleasant experience may have a negative impact on a firm's profile. This negative effect on firm's profile may harm the reputation of the firm. As a result, the firm may lose existing customers and/or fail to attract new customers.

There are existing methods that could be utilized to increase the customer satisfaction. These methods study the behavioral and conversational features of customer representatives who represent the firm. Customers evaluate the behavioral and conversational features of call center personnel m some of these methods by using a scoring system. Customer representatives performances are determined as a result of this evaluation.

The scoring system that is used in these systems may be customizable and can determine the performance of the customer representation in a particular conversation. The scoring system is not useful to determine placement of customer representatives in proper departments. Likewise, this scoring system is not suitable for recruitment activities either.

These methods focus on evaluating existing call center personnel. These methods are not useful for increasing customer base. These methods are not useful for recruiting new employees and tear training purposes.

SUMMARY

The object of the present invention is to create a system and method that is capable of analyzing the voices of successful customer representatives. A successful customer representative is the one that creates a positive effect on a customer such that the customer is satisfied as a result of a conversation with the customer representative.

Another object of the present invention is to create a speech analysis and evaluation system and method that is capable of generating reference models by analyzing the behavioral and conversational features of a speech and carrying out efficient recruitments by comparing these models.

Another object of the invention is to create a speech analysis and evaluation system and method of business' existing call center personnel. The method and system of this invention may be used to assign appropriate call center personnel to appropriate departments by preparing reference models for those departments. Candidates can be assigned to the appropriate customer service operations based upon the results. The reference models are generated for particular operations without using a generalized data therefore increasing the accuracy rate of the system and increasing the efficiency of the system and the operation.

Another object of this invention is to create a speech analysis and evaluation system and method for evaluating and training call center personnel. Operation-based appropriate speech features are determined and used. This method helps evaluate existing call center personnel. Furthermore the method can be used to train call center personnel. The method is capable of identifying certain phrases used by successful customer representatives. Phrases identified by this method, can be used by other customer representatives to increase the customer satisfaction.

Figure 1:
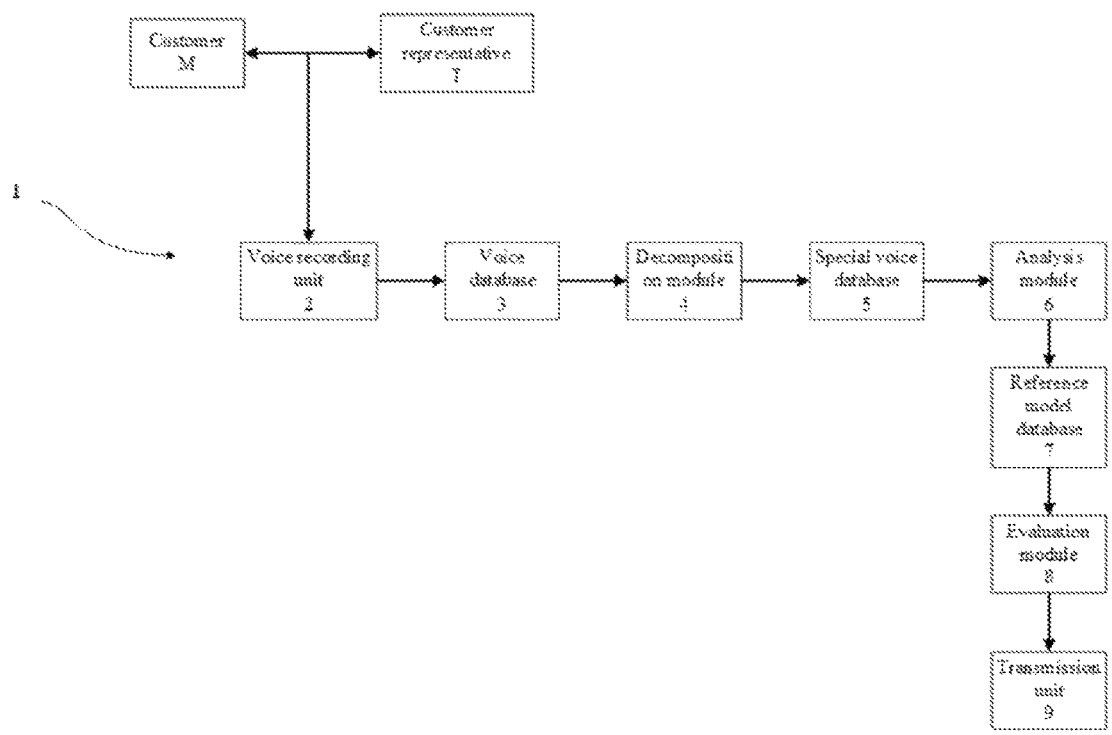
FIG. 1 is the general schematic view of the speech analysis and evaluation system of the present invention.
Figure 2:
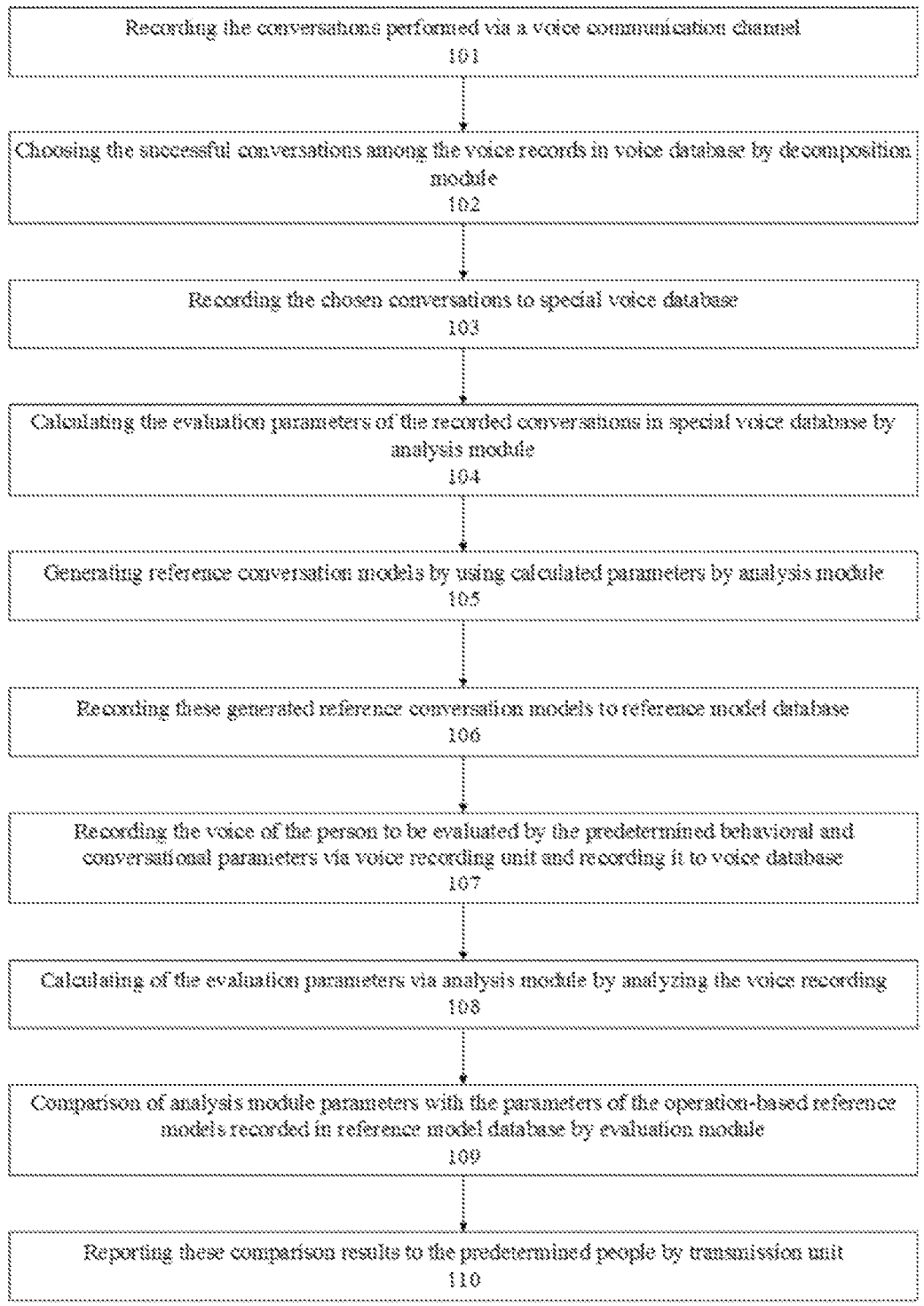
FIG. 2 is the view of the method steps belonging to the speech analysis and evaluation method of the present invention.

The parts in the drawings are enumerated separately and the definitions of these numbers are given below:
1. Speech analysis and evaluation system
2. Voice recording unit
3. Voice database
4. Decomposition module
5. Special voice database
6. Analysis module
7. Reference model database
8. Evaluation module
9. Transmission unit
M. Customer
T. Customer representative
100. Speech analysis and evaluation method
101. Recording the conversations performed is a voice communication channel between the customer (M) and the customer representative (T) to the operation-specific voice database (3) by voice recording unit (2),
102. Choosing the successful conversations among the voice records in voice database (3) by decomposition module (4),
103. Recording the chosen conversations to special voice database (5),
104. Calculating the evaluation parameters of the recorded conversations in special voice database (5) by analysis module (6),
105. Generating reference conversation models by using calculated parameters by analysis module (6),
106. Recording these generated reference conversation models to reference model database (7),
107. Recording the voice of the person to be evaluated by the predetermined behavioral and conversational parameters via voice recording unit (2) and recording it to voice database (3),
108. Calculating of the evaluation parameters via analysis module (6) by analyzing the voice recording, 109. Comparison of analysis module (6) parameters with the parameters of the operation-based reference models recorded in reference model database) by evaluation module (8), 110. Reporting these comparison results to the predetermined people by transmission unit (9).

DETAILED DESCRIPTION OF EMBODIMENTS

A speech analysis and evaluation systems and methods that are generated in order to achieve the object of the present invention are shown in the attached drawings, wherein:

A speech analysis and evaluation system (1) that is capable of analyzing the voices of successful customer representatives for determining behavioral and conversational features of successful customer representatives and using these features for recruiting and employee evaluation, comprising:

- at least one recording unit (2) for recording the conversations of the customer representative (T) with the customer (M),
- at least one voice database (3) where the voices recorded by the voice recording unit (2) are collected and stored,
- a decomposition module (4) for choosing the conversations stored in voice database (3) that are considered to be successful based on the customer feedback,
- at least one special voice database (5) wherein conversations are recorded,
- at least one analysis module (6) for calculating the operation-specific evaluation parameters by analyzing the conversations stored on the special voice database (5) and for generating reference models by using these parameters,
- at least one reference model database (7) wherein the reference models generated by the analysis module (6) are recorded therein,
- at least one evaluation module (8) for evaluating the new conversations by comparing them with the reference models,
- at least one transmission unit (9) for transmitting the evaluation results.

In speech analysis and evaluation system (1) of the present invention, each conversation between the customer (M) and the customer representative (T) is recorded by the voice recording unit (2) and is stored in the voice database.

Decomposition Unit (4) analyses the conversations stored in Voice Database (3) for selecting successful conversations. It is possible to apply a variety of objective and subjective evaluation methods for the decomposition of a speech. In one embodiment of the invention, the results of the customer satisfaction survey is used to determine a successful conversation between a customer representative and a customer. A successful conversation is defined as the conversation where the customer provides a positive feedback about his/her conversation with the customer representative. In another embodiment of the invention, call center supervisors determine evaluation criteria. These criteria are used to perform objective and subjective evaluation of employees to determine a successful customer representative. It is possible to perform an objective evaluation with a machine by using the acoustic features and text contents of the successful conversation evaluations. On the other hand, a supervisor may perform a subjective evaluation based on a predetermined criteria. A common evaluation result may also be obtained by mixing the results of a machine and a supervisor such that the results of machine and supervisor contribute to the final result based on a predetermined weight for each. The evaluation criteria of the customer representative (T) may vary based on the position. For example, it is also possible to automatically evaluate a customer representative (T) from the sales department according to the numerical value and target thereof in order for him/her to be considered as successful apart from the methods mentioned above such as by examining the sales results or by extracting the results from the database. The conversations chosen by Decomposition Module (4) are recorded in Special Voice Database (5).

In speech analysis and evaluation system (1) of the present invention, Analysis Module (6) analyzes the conversations recorded in Special Voice Database (5) in accordance with the acoustic and articulation parameters. One of the parameters is monotony, which affects the outcome of the conversation between the customer representative (T) and the customer (M). Monotony means using a single unvaried tone while talking. Thus, monotony may have impact on the outcome of a conversation.

In a preferred embodiment of the invention, another evaluated acoustic parameter is the amount of silence during a conversation. A relatively long silent period in a customer representative's (T) speech may have a negative effect on the outcome of the conversation. A relatively long pause in a conversation may cause a customer (M) think that the customer representative (T) considers the customer and/or the issue the customer brings up not being important. This may have a negative impact on the outcome of the conversation.

Another acoustic parameter is the hesitation number of the customer representative. Hesitation of a customer representative during the conversations by saying "um, er" etc. may also have a negative effect on the outcome of a conversation.

Another acoustic parameter preferred for the evaluation is the interruption frequency of the customer's (M) speech by the customer representative (T). When a customer (M) is speaking, interruption by the customer representative (T) is one of the factors that affect the outcome of the conversation. A customer (M) whose speech is frequently interrupted, may think that he/she cannot explain his/her demand or problem. This would lead to an unhelpful conversation and may have a negative impact on the outcome of the conversation.

Another acoustic parameter used for the evaluation is the number of overlaps. These are the parts where the customer (M) and the customer representative (T) talk at the same time, namely the speeches overlap. The customer (M) who thinks. that he/she cannot express himself/herself, may consider the conversation being unhelpful. The amount of speech the customer representative (T) provides for the customer (M) is another important acoustic parameter in terms of efficiency of the conversation. The outcome of the conversation is affected negatively in conversations where the customer representative (T) talks most of the time without giving the customer (M) an opportunity to express himself/herself. Likewise, the outcome of the conversation is affected negatively in conversations if the customer representative is quiet most of the time and the customer (M) does most of the talking. In this situation, the customer (M) may think that he/she cannot get answers from the customer representative (T) and that the customer representative (T) is not able to help the customer (M).

Another acoustic parameter is the speed of the speech of the customer representative (T). The customer (M) may not be able to comprehend what the customer representative (T) states when the customer representative (T) talks relatively fast.

The parameters disclosed herein are some of the parameters that can be used to evaluate the conversation between the customer representative (T) and the customer (M). It is important to note that it is possible to use additional acoustic parameters.

Apart from the acoustic parameters, the articulation of the customer representative (T) is another factor affecting the outcome of the conversation and therefore the success of the customer representative (T). In one embodiment of the invention, speech recognition reliability score is used to determine the articulation of the customer representative (T). The reliability score is the measure of how comprehensible the customer representative's (T) speech is to the customer (M). The higher the reliability score as a result of speech recognition, the more comprehensible is the customer representative's (T) speech by the customer (M).

It is possible to predefine a threshold value for each parameter wherein if that threshold is reached the outcome of the conversation is considered to be a successful conversation. The threshold value for each parameter is determined based on a particular set up. Different operations may have different successful customer representative (T) profiles. The successful conversation behaviors expected from a customer representative in the credit card department may be different from the one in the department of debt collection. For example, the successful reference value for the speed of a speech of a customer representative (T) from credit cards department may be x, while the successful reference value for the speed of the speech of a customer representative (T) from debt query department may be 2x. The operation-specific predefined threshold values shall be defined by determining the success criteria in a given operation.

In a preferred embodiment of the invention, the articulation and acoustic parameters can be analyzed and calculated from the voice recordings belonging to the customer representatives (T) who are considered successful as a result of the operation-specific feedbacks by using Analysis Module (6). Reference models can be generated from these parameters. These reference models are stored in the operation-based Reference Model Database (7).

In speech analysis and evaluation system (1) of the present invention, the reference models are prepared for each operation. This way, proper customer representative (T) with certain qualities will be deployed for the proper operation, matching, customer representatives to operations therefore yielding a higher customer satisfaction. Generating operation-specific reference models without generalizing increases the accuracy rate and the efficiency of the system.

In speech analysis and evaluation system (1) of the present invention, the voice recording of a candidate customer representative stored in Voice Database (3). This recording is performed by obtaining the voice recording during a recruitment process and these recorded voices are examined by Analysis Module (6). In a preferred embodiment of the invention the voice of a candidate is analyzed by the articulation and acoustic parameters as described in previous pages. Evaluation Module (8) compares the calculated parameters of an individual with the parameters of the models stored in Reference Model Database (7). Transmission Unit (9) may send the result of Evaluation Module (8) to authorized people. Furthermore Transmission Unit (9) may display the result of the comparison of behavioral and conversational parameters of people with the parameters of a reference model. Transmission Unit (9) also displays the result of a good match of a customer representative for a given operation.

Speech analysis and evaluation system (1) of the present invention can be used for training purposes at call centers. Analysis Module (6) determines the operation-specific speech features and reference models are generated based on those features. Personnel may be trained by using these reference models. For example if it is determined by Analysis Module (6) that the customer representatives (T) who used certain words/phrases in operation x were successful, then this information could be used by the other customer representatives (T). Such training may increase the performance of the customer representatives (T).

In speech and evaluation system (1) of the invention, Analysis Model (6) may examine the behavioral and conversational parameters of the existing customer representatives (T). Evaluation Module (8) compares the calculated parameters with the parameters of the operation-specific reference models stored in the data base. The result of the comparison may reveal that a customer representative with a speech that has a speed that is not appropriate for one department, may be suitable for another department. Reassignment of a customer representative (T) from one department to another one, based on the comparison results, may increase the customer (M) satisfaction.

In a preferred embodiment of the invention Analysis Module (6) calculates the speech parameters of a conversation where the customer (M) is dissatisfied. These parameters may be used to find out the factors that may play a role in customer (M) dissatisfaction. For example, Analysis Module (6) calculates the speed of the speech, when the customer (M) specifies that he is not satisfied about the speed of the speech of the customer representative (T). The resulting speed of the speech value is shared with the other employees for training purposes. The customer representative (T) may be transferred to an appropriate department.

Speech analysis and evaluation method of the invention (100) comprises the steps of:

recording (101) the conversations performed via a voice communication channel between the customer (M) and the customer representative (T) and storing the recording in Voice Database (3) by Voice Recording Unit (2), choosing (102) the successful conversations among the voice recordings in Voice Database (3) by Decomposition Module (4), recording (103) the chosen conversations to Special Voice Database (5), calculating (104) the evaluation parameters of the recorded conversations in Special Voice Database (5) by Analysis Module (6), generating (105) reference conversation models by using the calculated parameters by Analysis Module (6), recording (106) these generated reference conversation models to Reference Model Database (7), recording (107) the voice of the person to be evaluated by the predetermined behavioral and conversational parameters via Voice Recording Unit (2) and recording it to Voice Database (3), calculating (108) the evaluation parameters by Analysis Module) by analyzing the voice record, comparing (109) Analysis Module (6) parameters to the parameters of the operation-based reference models recorded in Reference Model Database (7) by Evaluation Module (8), and reporting (110) these comparison results to the predetermined people by Transmission Unit (9).

In non-standard speech detecting method (100) of the invention, all conversations performed between the customer (M) and the customer representative (T) are recorded (101) in operation-specific Voice Databases (3) by Voice Recording Unit (2). After these conversations are performed, the conversations of the customer representatives (T) which are considered to be successful are chosen (102) among the voice recordings in Voice Database (3) by Decomposition Module (4) and recorded (103) in operation-based Special Voice Database (5). According to an embodiment of the invention, the results of the customer satisfaction survey after the conversation, may be used in order to determine the conversations of the successful customer representatives. In another embodiment of the invention successful customer representatives may be determined by using the objective and subjective evaluation results within the evaluation criteria by the call center supervisors. Different selection methods can be used for different departments.

Analysis Module (6) calculates the predetermined evaluation parameters of the recorded conversations in Special Voice Database (5). These evaluation parameters may be acoustic and articulation parameters. For example, the acoustic parameters such as speed of a speech of the customer representative (T), the length of the hesitation time the length of the silence time or speaking with a monotonous voice during the conversation, influence the satisfaction of the customer (M). The operation-specific reference models are generated (105) using these parameters that are calculated by Analysis Module (6). For example if Analysis Module (6) examines the conversations in Special Voice Database (5) and determines that the speed of the speech is 2× and this speed of speech produces satisfactory results during a conversation with a customer representative in credit card department, then the reference model ill be assigned a speed of 2× for a similar situation. The operation-based reference models of all predetermined parameters are recorded (106) to Model Database (7).

In the case of recruitment procedures, the voice of a person is recorded via Voice Recording Unit (2) and recorded (107) to Voice Database (3). The recorded voice of a person to be evaluated by using the predetermined behavioral and conversational parameters. In an embodiment of the invention a voice recording can be obtained by asking a candidate customer representative to read an evaluation text. In another preferred embodiment of the invention it is also possible to simulate the voice recording process by an automatic system such as an outbound. Thus, it is possible that simulations may be performed by vocalizing the case between a virtual operator and a candidate consumer representative and at the same time the voice recordings of a candidate customer representative are received by Voice Recording Unit (2) and are recorded in Voice Database (3).

In speech analysis and evaluation method (100) of the invention Analysis Module (6) calculates (108) the predetermined behavioral and conversational evaluation parameters by analyzing the voice recording of the candidate consumer representative recording in Voice Database (3). These parameters calculated by Analysis Module (6) are compared (109) with the operation-specific special reference models stored in Model Database (7) by Evaluation Module (8). As a result of this comparison the resulting evaluation result can be displayed (110) by Transmission Unit (9).

In an embodiment of the invention the results obtained as a result of comparison of Evaluation Module (9) may be transmitted by sending an e-mail, SMS, pop-up to the smart devices of predetermined people or may be displayed on a smart device via an interface. Smart devices may be a smart phone, a tablet and a computer.

Speech analysis and evaluation method (100) of the invention ma also be used for training and performance evaluation of the consumer representatives (T). The voice recording of the consumer representatives (T) is obtained and stored in Voice Database (3). Analysis Module (6) calculates the parameter values of the stored voice recordings. Evaluation Module (8) compares the parameter values of the voice recordings with the parameter values in the reference models. As a result of the evaluation, for example, the results may show that the parameters in the voice of a customer representative (T) working in the credit card department may provide a better match for an ideal customer representative (T) working in the lost notification department. In this case the result is communicated by Transmission Unit (9). The customer representative (T) can then be transferred to the department that would result in a better working performance. The company saves time and cost, bypassing the staff recruiting and training processes as the consumer representative (T) is assigned to the right department. In another embodiment of the invention. Analysis Module (6) generates reference models and the system determines which words and phrases are more frequently used in different operations in the reference models. The system also determines which phrases provides a better result in terms of customer satisfaction. A customer representatives (T) in a given operation can be informed and encouraged to use those words and phrases in a conversation that would yield a better customer satisfaction.

Speech analysis and evaluation system (1) and method (100) of the invention is not limited to the above-mentioned examples and essentially is as described in the claims.

I claim:

1. A speech analysis and evaluation system comprising:
   at least one recording unit which records conversations of a customer representative with a customer;
   at least one voice database where voices from a voice recording unit are stored;
   a decomposition module for choosing successful conversations in the voice database according to customer satisfaction, wherein the successful conversations are selected based on factors including customer satisfaction survey results;
   at least one voice database where the chosen conversations are recorded;
   at least one analysis module which calculates operation-specific evaluation parameters by analyzing the conversations stored on the voice database and generates a plurality of reference models appropriate for the operation-specific evaluation parameters;
   at least one reference model database for storing the reference models generated by the analysis module;
   at least one evaluation module for evaluating new conversations by comparing them to the reference models;
   at least one transmission unit for sending the evaluation results;
   wherein the analysis module analyzes each conversation in the voice database based on acoustic and articulation parameters;
   wherein the acoustic parameters include monotony in the conversation, an amount of silence during the conversation, a hesitation number of the customer representative during the conversation, an interruption frequency of a customer's speech by the customer representative during the conversation, a number of overlaps between the customer's speech and a customer representative's speech in the conversation, and a speed of the customer representative's speech;

wherein the articulation parameters include a speech recognition reliability score of the customer representative's speech, the speech recognition reliability score is a measure of how comprehensible the customer representative's speech is to the customer.

2. The speech analysis and evaluation system according to claim 1, wherein the analysis module calculates speech parameters having a negative effect on a customer satisfaction.

3. The speech analysis and evaluation system according to claim 1, wherein the evaluation module performs evaluation by comparing acoustic and articulation parameters of a new voice recording with the acoustic and articulation parameters of the plurality of reference models.

4. A speech analysis and evaluation method comprising the steps:

recording conversations performed via a voice communication channel between a customer and a customer representative;

storing the recorded conversations in an operation-specific voice database;

choosing successful conversations according to customer satisfaction among the voice recordings in a voice database, wherein the successful conversations are selected based on factors including customer satisfaction survey results or sales resulting from the conversations;

storing the chosen conversations to a voice database;

calculating speech evaluation parameters of the recorded conversations in the voice database;

generating a plurality of operation-specific reference conversation models by using the calculated speech evaluation parameters;

storing the plurality of operation-specific reference conversation models in a reference model database;

recording a voice of a person to be evaluated by predetermined behavioral and conversational parameters;

storing the predetermined behavioral and conversational parameters in the voice database;

analyzing the voice recordings;

calculating the evaluation parameters of the voice recordings;

comparing the speech evaluation parameters of the voice recording with the speech evaluation parameters of the operation-specific reference conversation models;

reporting the result of the comparison results to a number of predetermined people;

wherein the analysis module analyzes each conversation in the voice database based on acoustic and articulation parameters;

wherein the acoustic parameters include monotony in the conversation, an amount of silence during the conversation, a hesitation number of the customer representative during the conversation, an interruption frequency of a customer's speech by the customer representative during the conversation, a number of overlaps between the customer's speech and a customer representative's speech in the conversation, and a speed of the customer representative's speech;

wherein the articulation parameters include a speech recognition reliability score of the customer representative's speech, the speech recognition reliability score is a measure of how comprehensible the customer representative's speech is to the customer.

5. The speech analysis and evaluation method according to claim 4, further comprising calculating predetermined acoustic and articulation parameters of the conversations in the step of "calculating the speech evaluation parameters of the recorded conversations in the voice database by an analysis module".

6. The speech analysis and evaluation method according to claim 4, wherein a voice recording is obtained by having a person read a predetermined written text or to have a mutual conversation with a virtual operator in the step of "recording the voice of the person to be evaluated by the predetermined behavioral and conversational parameters via a voice recording unit and recording it to the voice database".

7. The speech analysis and evaluation method according to claim 4, wherein the step of "reporting the comparison results to the predetermined people over a transmission unit" includes sending an e-mail, an SMS, a pop-up to smart devices and/or displaying the e-mail, the SMS, the pop-up on the screens of smart devices by an interface.

8. The speech analysis and evaluation method according to claim 4, further comprising assigning each customer representative to a specific department based on the comparison results for conversations of the each customer representative.

\* \* \* \* \*